United States Patent
Bender et al.

(10) Patent No.: US 6,719,116 B2
(45) Date of Patent: Apr. 13, 2004

(54) AIR ASSISTED VEHICLE CLUTCH LINKAGE

(75) Inventors: Burnell L. Bender, Woodburn, IN (US); Brian P. Marshall, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/202,364

(22) Filed: Jul. 24, 2002

(65) Prior Publication Data

US 2004/0016618 A1 Jan. 29, 2004

(51) Int. Cl.$^7$ .......................... F16D 25/08; F16D 48/04
(52) U.S. Cl. .................. 192/85 C; 192/91 R; 192/99 S
(58) Field of Search .......................... 192/85 R, 85 C, 192/85 CA, 99 R, 99 S, 91 R, 91 A (56) References Cited

U.S. PATENT DOCUMENTS

| | | | | |
|---|---|---|---|---|
| 3,710,909 A | * | 1/1973 | Johnson | 192/91 R |
| 3,908,514 A | * | 9/1975 | Rist | 91/391 R |
| 4,717,002 A | * | 1/1988 | Sasamura | 192/99 S |
| 4,987,983 A | * | 1/1991 | Adams | 192/13 R |
| 5,579,882 A | * | 12/1996 | Stuhldreher | 192/85 C |

FOREIGN PATENT DOCUMENTS

| | | | | | |
|---|---|---|---|---|---|
| JP | 4-310114 A | * | 11/1992 | | G05G/7/04 |

* cited by examiner

Primary Examiner—Richard M. Lorence
(74) Attorney, Agent, or Firm—Jeffrey P. Calfa; Dennis Kelly Sullivan; Susan L. Lukasik (57) ABSTRACT

Clutching arrangements for motor vehicle standard transmissions. The force required to clutch a vehicle transmission using a foot pedal is reduced by providing a compressed air actuated boost device attached to the clutch linkage. The degree of boost is selectable using a hand controlled air pressure regulator. Activation of the boost device is controlled by switches which are sensitive to clutch pedal position.

15 Claims, 6 Drawing Sheets

AIR ASSISTED VEHICLE CLUTCH LINKAGE

BACKGROUND OF THE INVENTION

1. Field of the Invention

The present invention relates to motor vehicle standard transmission clutches and more particularly to an air assist system for reducing clutch pedal effort in a standard transmission equipped motor vehicle.

2. Description of the Problem

Both standard and automatic shift transmissions are well known in the motor vehicle industry. Standard transmissions, sometimes called manual transmissions, remain common on light cars, trucks and busses, due to their mechanical simplicity, lower initial cost, lower weight and perceived efficiency relative to automatic transmissions. Standard transmissions typically provide a shift lever which is hand operated by the driver of a vehicle to move the transmission between the various available gear ratios provided in the transmission. The shift lever is connected with a linkage system to selectively engage a selected gear of an input shaft/counter-shaft standard transmission. During the disengagement of one gear ratio and the subsequent engagement of another gear ratio, a clutch is used to mechanically disengage the transmission from the vehicle's engine. Disengagement of the clutch is typically done by the driver depressing a clutch pedal located under the instrument dash board and against the vehicle dash panel. The clutch pedal is connected to a clutch lever using a clutch linkage.

Standard transmissions installed on trucks can require excessive clutch effort on the part of some drivers or in stop and go situations. As a result, the driver can become tired or uncomfortable. The value in providing a mechanism to reduce the effort required to disengage clutches has long been recognized. U.S. Pat. No. 4,717,002 to Sasamura teaches one such clutch linkage power assist mechanism. Sasamura relies on pressurized air available on heavy duty trucks to drive a piston/cylinder arrangement which is connected to the linkage to provide a boost to the driver's leg pressure to disengage a clutch. The cylinder receives air from and discharges air through a control valve. Valve operation is controlled by being directly connected into the clutch linkage. Sasamura also describes prior art clutch linkage systems using a piston/cylinder boost arrangement to reduce driver clutch pedal effort. He describes such systems as having to time properly the assistance provided by the air cylinder by sensing the build up of force on the clutch pedal to provide air to the cylinder in direct proportion to the clutch pedal force. Such sensitivity to clutch pedal force is obtained by incorporating the valve into the clutch linkage, a feature which Sasamura retained. Splicing the valve into the linkage was seen as assuring the capability of operating the clutch in a purely manual mode without boost, should the vehicle air system be compromised or unavailable.

SUMMARY OF THE INVENTION

An object of the present invention is to provide a clutch linkage requiring reduced effort for disengaging a standard transmission clutch.

Another object of the present invention is allow operator selection of the clutch effort required for disengaging a clutch.

Still another object of the present invention is to provide clutch linkage operation which is relatively immune to failure of the clutch disengaging boost system.

The invention provides for these and other objects in a standard transmission for a vehicle. The transmission comprises a clutch having an engaged state and a disengaged state. The clutch is moved between engaged and disengaged states using a clutch pedal which is connected to the clutch by a linkage assembly. Depression of the clutch from a default position moves the linkage assembly which in turn moves the clutch from its engaged state to its disengaged state. A spring provides for return of the linkage assembly to the default position, which returns the clutch to its default engaged state.

A powered actuator is coupled to the linkage assembly for generating a force urging the linkage assembly in the direction disengaging the clutch. Where the actuator is powered by compressed air, a relief valve operates to vent air from the powered actuator when open and to prevent venting when closed. The relief valve state is controlled by the position of the clutch pedal in a free travel. When the clutch pedal is in a first position in the free travel the valve is open and upon movement of the clutch pedal from the first position in the free travel the valve is closed. For compressed air systems the pressure assist is operator selected. An energization valve operates to deliver compressed air from the source of compressed air to the powered actuator when open, the energization valve being responsive to movement of the clutch pedal to a second position in the free travel.

The first and second points in the free travel of the clutch pedal are associated with first and second switches which are actuated by movement of the clutch pedal. First and second solenoid valve actuators provide for operating the relief valve and the energization valve, respectively, in response to changes in state of the first and second switches. The valves are arranged such that the energization valve has an inlet for receiving air from the source of compressed air, an exhaust port and an outlet to the compressed air powered actuator, the energization valve being operable in an open state to connect the inlet to the outlet and in the closed state for connecting the outlet to the exhaust port. The relief valve has an inlet connected to the exhaust port and an outlet, and being operable in a closed state to block communication between its inlet and its outlet and in an open state to connect its inlet to the outlet.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
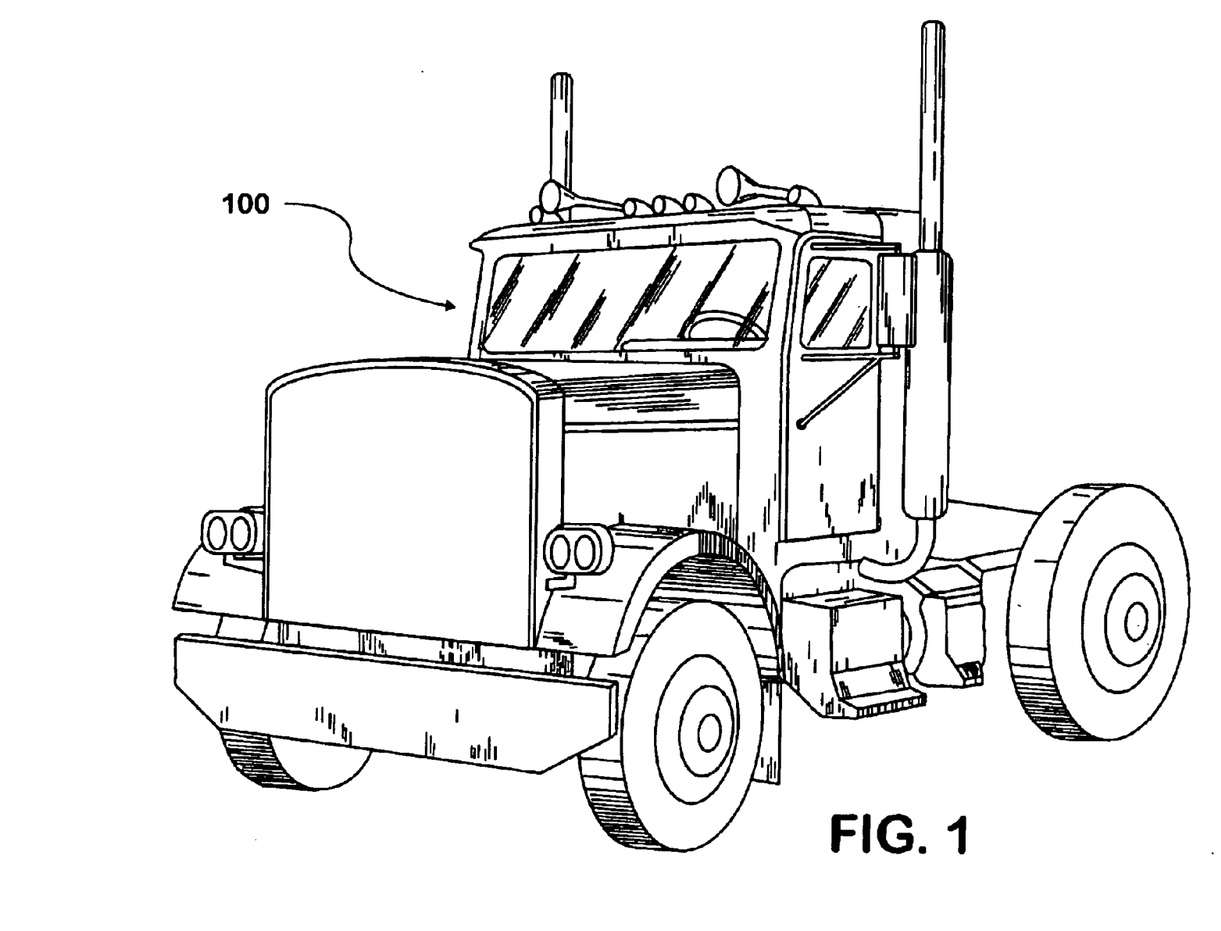
FIG. 1 is a perspective view of a truck on which the invention is practiced.

Referring now to the figures and in particular to FIG. 1, where a truck 100 is illustrated. Truck 100 represents the class of vehicles with which the air assisted vehicle clutch linkage of the present invention is advantageously utilized. It is such vehicles which generally exhibit the highest clutch efforts.

Figure 2:
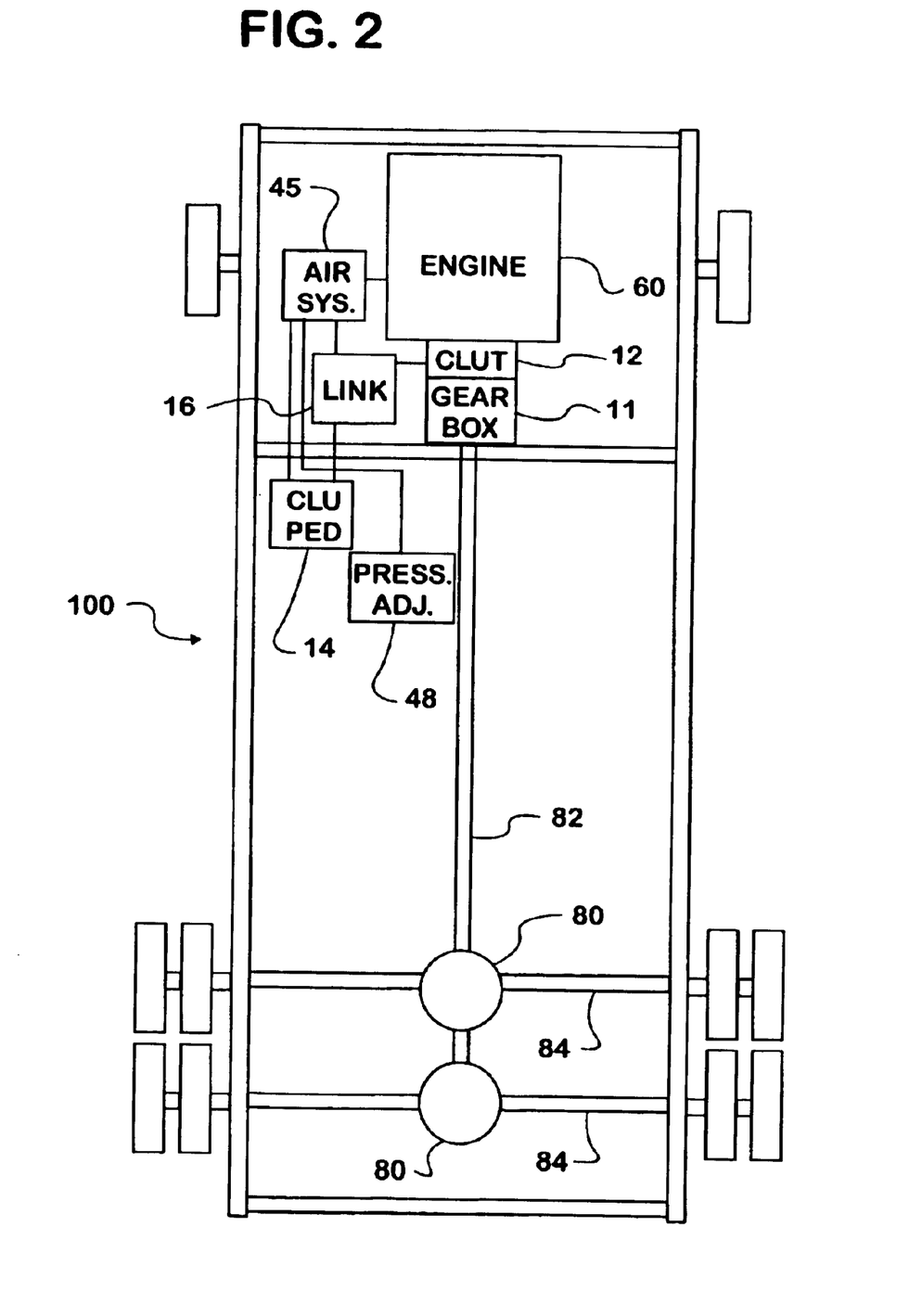
FIG. 2 is a plan view of a truck chassis incorporating the standard transmission of the present invention.

FIG. 2 is a plan view of truck 100 illustrating major components of the vehicle and invention and their approximate spatial relationship to one another. Truck 100 includes an engine 60 the output of which is coupled to rear end differentials 80 and rear axles 84 by a clutch 12, a gear box 11 and a propeller shaft 82. Clutch 12 is selectively engaged and disengaged to allow selection of a desired gear ratio in gear box 11. Engagement of clutch 12 is controlled by the operator's use of a clutch pedal 14, which is connected to the clutch 12 by a linkage 16. Operator effort is minimized by an air boost system 45. The amount of boost provided is adjustable using a dash panel mounted dial 48. The boost system can also be provided by electrical or hydraulic systems. In an electrical system the voltage applied to a d.c. electric motor can be adjusted to vary the boost provided.

Figure 3A:
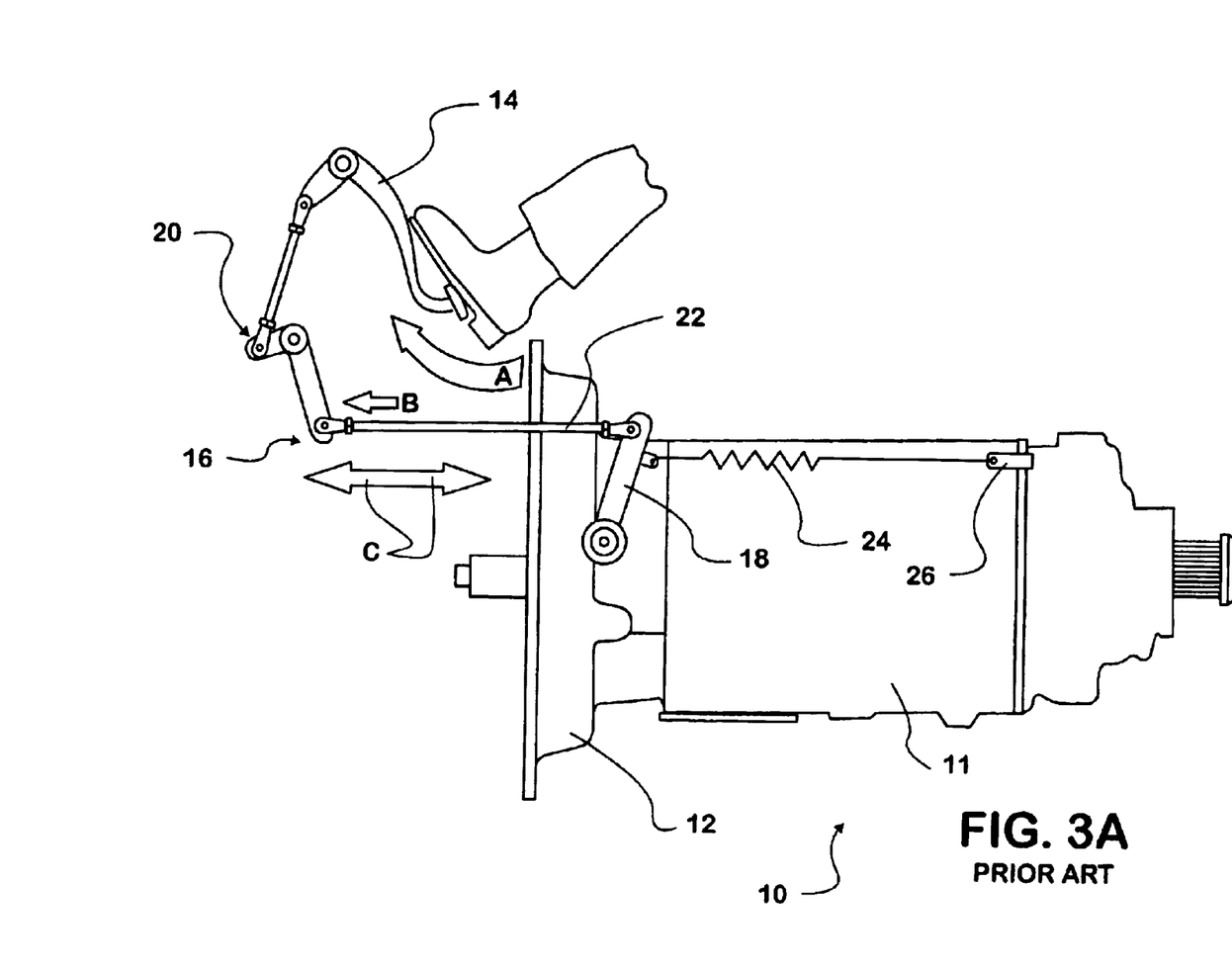
FIGS. 3A and B are diagrammatic illustrations of typical clutch linkage for contemporary standard transmissions.
Figure 3B:
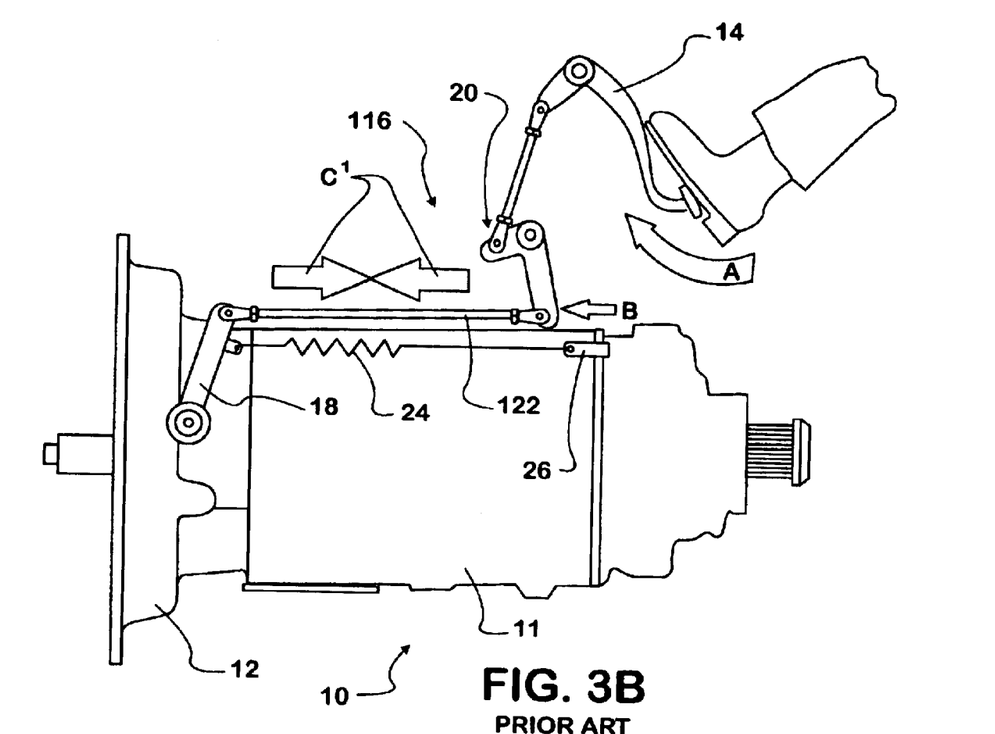

FIGS. 3A and B illustrate a standard transmission 10 which includes a clutch 12 and a gear box 11. Clutch linkage geometry can be arranged to be either a "pull" type clutch linkage 16 as illustrated in FIG. 3A or a push type linkage 116 as illustrated in FIG. 3B. Clutch 12 is moved between engaged and unengaged states by movement of clutch release lever 18. In either case clutch release lever 18 is part of a linkage assembly 16, which includes a pull link 22 connected between the clutch lever and a clutch pedal support linkage 20. In the alternative geometry of FIG. 3B a push linkage 122 is substituted for pull linkage 22 and lever 18 is pushed rather than pulled to the disengaged position. Clutch pedal 14 is attached to one end of clutch pedal support linkage 20. Clutch release lever 18 is biased toward its clutch engaging position by a spring 24 connected at one end to the lever and at its other end to a fixed point 26. When clutch pedal 14 is depressed, as indicated by arrow "A", the lower end of pedal support linkage 20 moves away from (FIG. 3A) or toward (FIG. 3B) clutch 12, as indicated by arrow "B", pulling link 22, or pushing link 122, in the same direction. At the same time, clutch lever 18, as a result of return spring 24, applies a force on the opposite end of linkage 22 and in the opposite direction. As a result, link 22 is placed under tension, as represented by arrow "C". Link 122 is placed under compressive force as indicated by arrow "C".

The force required to depress clutch pedal 14 to move the clutch lever 18, overcome any parasitic drag on the linkage assembly 16 and overcome the counter force generated by spring 24 is typically much greater on trucks than on passenger cars. As described above, pressurized air assisted systems providing supplemental force to a clutch linkage assembly are known in the art.

As described below, the present invention allows the operator to select the amount of force which the boost system provides, and to hold boost with little or no effort. The linkage retains the fail-safe backup of a direct linkage between the clutch pedal and clutch lever.

Figure 4A:
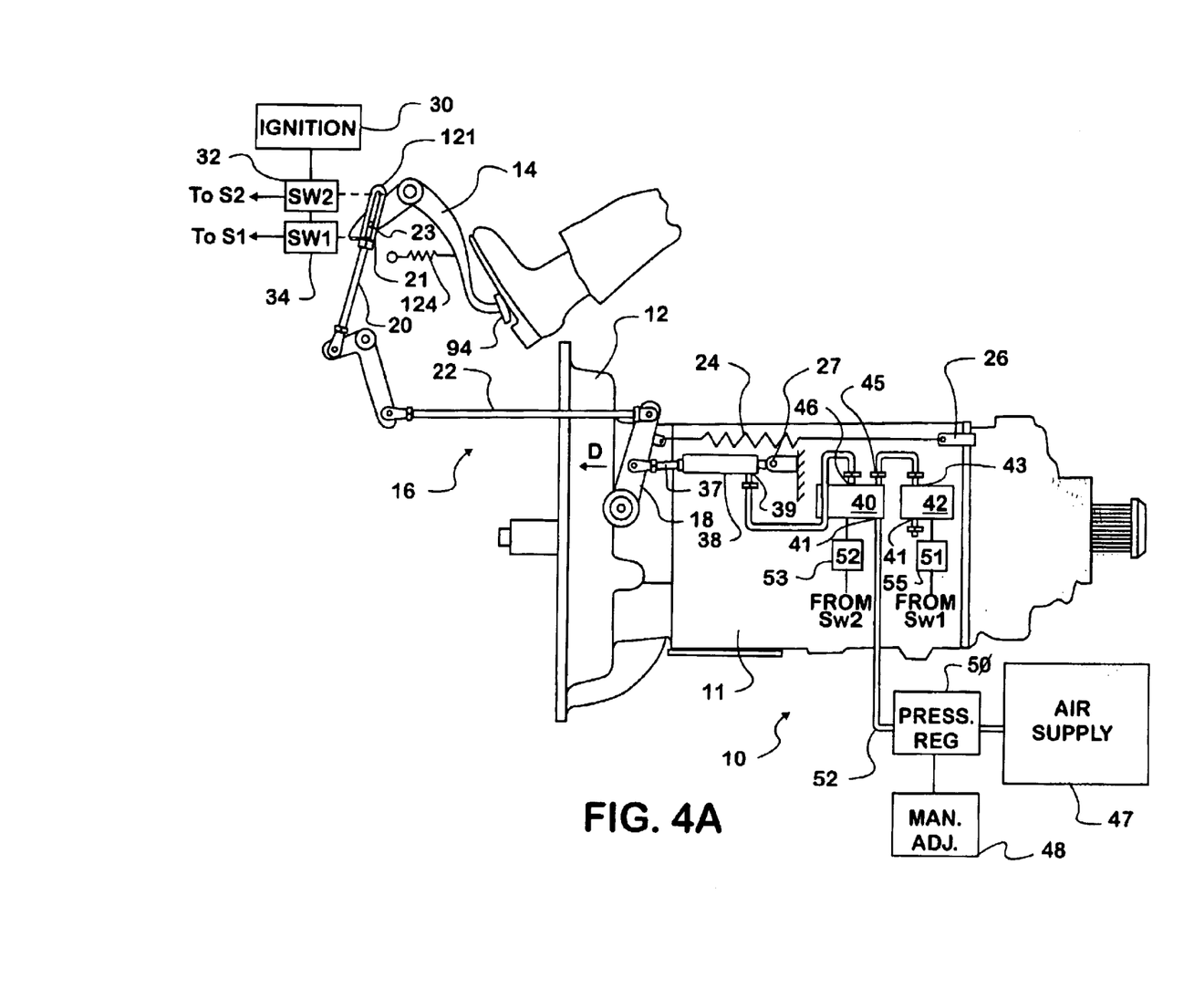
FIGS. 4A and B are diagrammatic illustrations of clutching linkages for standard transmission modified to incorporate the present invention.

FIGS. 4A and B illustrate in detail the invention in a preferred embodiment. As in FIGS. 3A and B a standard transmission 10 is depicted including a clutch 12 and a gear box 11. Clutch 12 is moveable between engaged and unengaged states by the positioning of clutch release lever 18. Clutch release lever 18 is part of linkage assemblies 16 and 116, which include links 22 and 122, respectively, connected between the clutch lever and a clutch pedal support linkage 20. Clutch pedal 14 is attached to one end of clutch pedal support linkage 20. Clutch release lever 18 is biased toward its clutch engaging position by a spring 24 connected at one end to the lever and at its other end to a fixed point 26. When clutch pedal 14 is depressed, the lower end of pedal support linkage 20 moves away from (FIG. 4A) or toward (FIG. 4B) clutch 12, pulling link 22 or pushing link 122 in the same direction. At the same time, clutch lever 18, as a result of return spring 24, applies a force in the opposite direction on the opposite end of linkages 22 and 122.

Figure 4B:
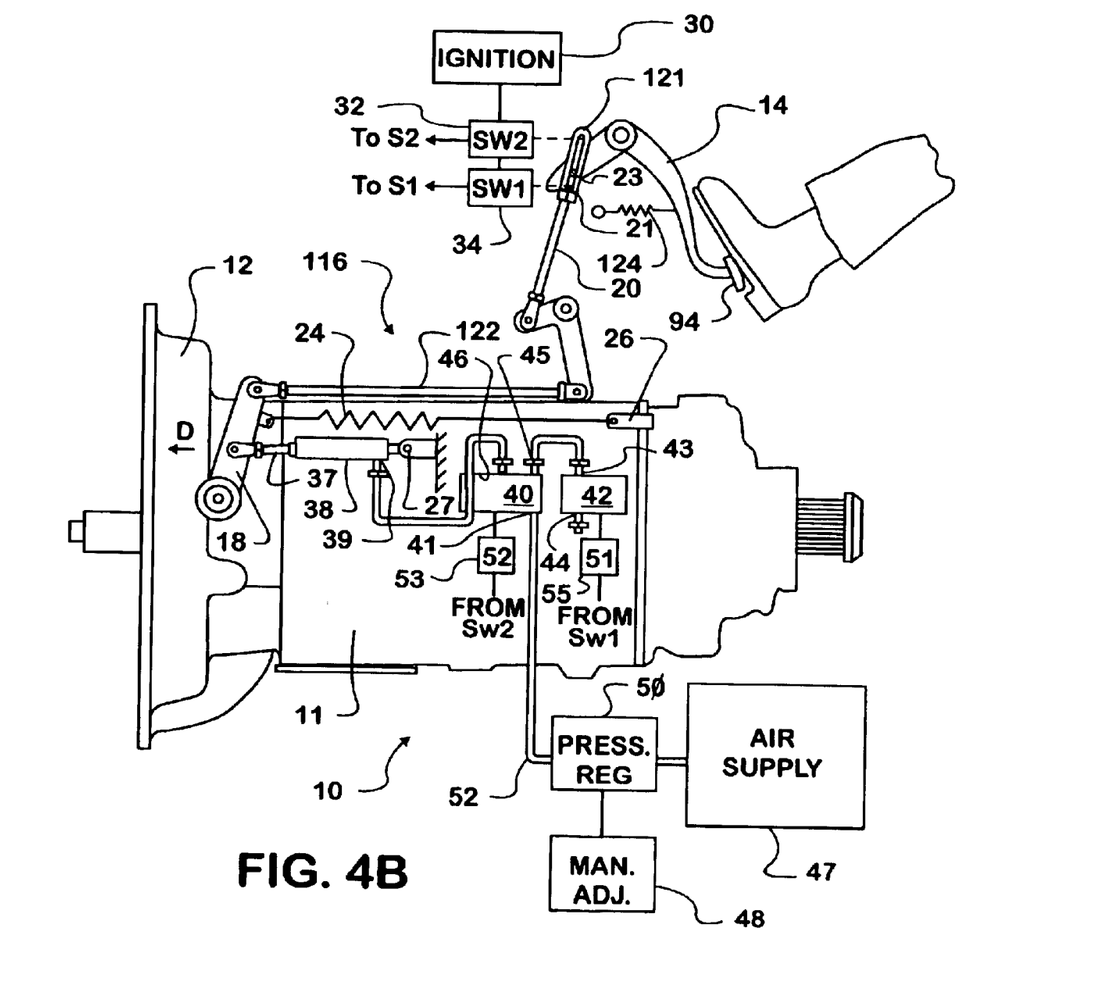

Boost to moving linkage assembly 16 or 116 is provided from an air actuated reciprocating piston operating in a cylinder 38, which is mounted at one end to a fixed point 27. A piston rod 37 projects from the other end of cylinder 38 which is connected at its own exposed end to a clutch lever 18. Air under pressure introduced to cylinder 38 may be used to force rod 37 in the direction indicated by the letter "D", moving the lever in a direction for disengaging the clutch 12. The details of air cylinder and clutch operation are well known in the art and are omitted here for the sake of simplicity. Those skilled in the art will recognize that a clutch which is disengaged is one which is not then mechanically coupling the engine and the gear box. A clutch which is in its engaged state is one which is mechanically coupling the output of the engine to the gear box. Clutches are routinely "disengaged" to allow the gear selection in the gear box to be changed.

Pressurization and depressurization of cylinder 38 is provided through an air supply 47 and valves 40 and 42. A conventional heavy duty truck air supply 47, typically includes compressors and compressed air storage tanks. Compressed air from air supply 47 is coupled to an energization valve 40 through a pressure regulator 50 in an air conduit 52. Pressure regulator 50 is adjustable by hand using a manual adjustment controller 48 which may be conveniently positioned on the vehicle dashboard. By allowing control of the air pressure of air supplied to cylinder 38 an operator may provide exactly as much boost as he desires to achieve a personally comfortable clutch effort.

Energization valve 40 controls the delivery of air to cylinder 38. Valve 40 is opened or closed by an energization solenoid (S2) 53, which in turn is controlled by an energization switch (SW2) 32. Pressurized air is delivered to energization valve 40 via an inlet 41. Inlet 41 is selectively connected to an outlet port 46 when valve 40 is "open", that is when positioned to couple inlet 41 to outlet 46. When valve 40 is closed inlet 41 is blocked. Inlet 39 to cylinder 38 is then connected via outlet 46 through valve 40 to exhaust port 45. Exhaust port 45 is connected in turn to inlet 43 on relief valve 42, which may or may not allow the compressed air in cylinder 38 to be vented, as described below. The default state for energization valve 40 is closed, allowing air to pass from cylinder 38 through the valve to relief valve 42. The default state of cylinder 38 is to be unpressurized. The default states are associated with clutch pedal 14 being in its default state, i.e. not depressed.

An enable or relief valve 42 has an inlet 43 and an exhaust 44. When "open", relief valve 42 allows communication between inlet 43 and exhaust 44. When "closed", relief valve 42 provides no outlet. The state of valve 42 is controlled by solenoid (S1) 55, which in turn is controlled by the state of the signal from relief switch (SW1) 34. The default condition of relief valve 42 is open, allowing venting of air from cylinder 38.

Two clutch pedal 14 actuated switches 32 and 34 are provided for controlling solenoids 53 and 55 and to position valves 40 and 42. Switches (SW2 and SW1) 32 and 34 are active only if ignition switch 30 is closed. Switches 32 and 34 are positioned with respect to clutch pedal support linkage 20 to be actuated by movement of clutch pedal 14. There exists a short, but distinct, free travel of clutch pedal 14 between the positions of contact with the relief switch 34 and the energization switch 32. The free travel is defined by a slot 121 in a slotted head 21, which is mounted on one end of clutch pedal linkage 20. Clutch pedal 14 is an "L" shaped arm with a pawl 23 set near one end of the arm and a foot rest 94 mounted at the other end. Pawl 23 is fitted into a slot 121 located in slotted head 21. A supplementary spring 124, connected between clutch pedal 14 and a fixed point provides bias to return clutch pedal 14 to a position where pawl 23 is located in the bottom of slot 121. Depression of clutch pedal 14 moves pawl 23 to the opposite end of slot 121 before linkage begins, or resumes movement.

Relief switch 34 is positioned to be actuated as pawl 23 moves away from the bottom of the slot 121. Energization (or pressurization) switch 32 is positioned to be thrown when pawl 23 reaches the top of the slot 121 and the clutch pedal 14 actually begin to engage clutch linkage 16. The positioning of switches 34 and 32 with respect to slot 121 means that relief switch 34 changes state first during initial depression of clutch pedal 14. This closes the switch and activates solenoid 55 to close relief valve 42. With relief valve 42 closed, any boost added to cylinder 38 is held. Energization switch 32 is contacted by further depression of clutch pedal 14 sufficient to move pawl 23 to the top of slot 121. Closure of switch 32 causes solenoid 53 to operate to open valve 40, allowing pressurized air to pass through valve 40 from compressed air source 47 to cylinder 38 and thereby generating a force from cylinder 38 transmitted along piston shaft 37 urging clutch lever 18 toward a position disengaging clutch 12.

Release of clutch pedal 14 results in spring 124 acting to move the clutch pedal 14 away from a depressed position. Pawl 23 moves in slot 121 resetting switches 32 and 34 in that order. Return of pawl 23 to its start position returns valves 40 and 42 to their default states, in the reverse order from that occurring as the pedal was depressed. The relief of pressure in cylinder 38 allows spring 24 to return clutch linkage 16 to its default position, engaging the clutch 12. The free travel in the pedal travel provided by slot 121 between actuation positions for the switches allows the operator to maintain, or even adjust, pressure in cylinder 38 by keeping clutch pedal 14 positioned so that pawl 23 does not return to the bottom of slotted head 21. Under these circumstances air pressure is held in cylinder 38.

Air can be supplied from compressed air source 47 at sufficient pressure to move lever 18 without the driver moving pedal 14 past the point where switch 32 is contacted. Thus clutch 12 may be kept in a state of partial engagement by briefly allowing pressurization of cylinder 38 and then holding the clutch pedal 14 with pawl 23 floating in the slot 121 between contact positions with switches 32 and 34. Because spring 124 has a low spring constant the leg effort required to keep pawl 23 floating is minimal. Spring 124 will always bias clutch pedal 14 in a direction to return pawl 23 to the bottom of the slot of slotted head 21, where it activates relief valve 42 to return clutch 12 to full engagement. Briefly moving clutch pedal 14 to the limits of its free travel in slot 121 can be done to control the degree of engagement of clutch 12 by adding or releasing air from cylinder 38. This feature should prove advantageous in reducing driver effort under conditions of heavy, stop and go traffic. The free travel in clutch pedal 14 provided by slot 121 will, with respect to the operator, move up and down depending upon the position of linkage 16.

The present invention provides a clutch linkage requiring reduced effort for disengaging a standard transmission clutch and allowing an operator to hold a partially engaged clutch with little to no effort. The operator can fully select a comfortable level clutch effort, even down to a level requiring essentially no clutch effort. The present invention fully preserves a conventional mechanical linkage so that failure of the air pressurization system has not effect on conventional use of the clutch. Those skilled in the art will now appreciate that clutch positioning mechanisms may be air powered, hydraulic or electro mechanical, among other systems.

While the invention is shown in only one of its forms, it is not thus limited but is susceptible to various changes and modifications without departing from the spirit and scope of the invention.

What is claimed is:

1. A vehicle comprising:
   an engine;
   a transmission;
   a clutch mounted between the engine and to the transmission for selective engagement and disengagement, the clutch mechanically connecting the transmission to the engine when in engagement;
   a clutch pedal having a free travel;
   a clutch linkage connected between the clutch pedal and the clutch for controlling engagement and disengagement of the clutch in response to movement of the clutch pedal through the travel;
   a positioning boost mechanism coupled to the clutch linkage for urging the clutch linkage to a position disengaging the clutch when powered;
   a hold switch coupled to the positioning boost mechanism and responsive to movement of the clutch pedal in the free travel for enabling and disabling the positioning boost mechanism; and
   a power switch coupled to the positioning boost mechanism and responsive to movement of the clutch pedal relative in the free travel for powering the positioning boost mechanism.

2. A vehicle as set forth in claim 1, wherein the hold switch and the power switch are mutually spaced along the free travel to create a dead zone in operation of the positioning boost mechanism.

3. A vehicle as set forth in claim 2, wherein the positioning boost mechanism further comprises:
   a source of pressurized air;
   an air driven actuator connected to the clutch linkage;
   an energization valve connected to receive air under pressure from the source of pressurized air and to pass the air to the air driven actuator in a first state, and further connected to vent air from the air driven actuator to an outlet in a second state; and
   a hold valve connected to receive air from the outlet from the energization valve and to vent the air from the positioning boost mechanism in a first state and to block venting of air from the outlet in a second state.

4. A vehicle as set forth in claim 3, further comprising the hold switch being operatively coupled to the hold valve to control the state thereof and an energization switch being operatively coupled to the energization valve to the control the state thereof.

5. A vehicle as set forth in claim 4, further comprising a pressure line connecting the source of pressurized air to the energization valve and a manually adjustable pressure regulator in the pressure line.

6. A standard transmission for a vehicle, comprising:

a clutch having an engaged state and a disengaged state;

a clutch pedal;

a linkage assembly coupling the clutch pedal to the clutch for moving the clutch from Its engaged state to its disengaged state in response to depression of the clutch pedal;

a fluid powered actuator coupled to the linkage assembly for generating a force urging the linkage assembly in a direction for disengaging the clutch;

a linkage spring connected to the linkage assembly to generate a force oppositely directed to the force generated by the fluid powered actuator;

a pedal spring connected to the clutch pedal to urge the clutch pedal toward a released position;

a source of pressurized fluid;

a relief valve operable to vent fluid from the fluid powered actuator when open and to prevent venting when closed, responsive to movement of the clutch pedal past from the released position; and an energization valve operable to deliver pressurized fluid from the source of pressurized fluid to the fluid powered actuator when open and responsive to depression of the clutch pedal a predetermined distance from its released position.

7. A standard transmission for a vehicle as set forth in claim 6, wherein the pressurized fluid is compressed air.

8. A standard transmission for a vehicle as set forth in claim 7, further comprising:

a relief switch positioned with the clutch linkage to be actuated by movement of the clutch pedal from the released position; and an energization switch positioned with the clutch linkage to be actuated by movement of the clutch pedal the predetermined distance.

9. A standard transmission for a vehicle as set forth in claim 8, further comprising:

an energization valve solenoid connected to the energization valve and operably responsive to the energization switch for controlling the state of the valve; and a relief valve solenoid connected to the relief valve and operably responsive to the relief switch for controlling the state of the relief valve.

10. A standard transmission for a vehicle as set forth in claim 7, further comprising:

a hand adjustable pressure regulator connected between the energization valve and the air compression system.

11. A standard transmission for a vehicle as set forth in claim 9, further comprising:

a hand adjustable pressure regulator connected between the energization valve and the air compression system.

12. A standard transmission for a vehicle as set forth in claim 11, further comprising:

the energization valve having an inlet connected to the hand adjustable pressure regulator, an exhaust port connected to the relief valve and an outlet connected to the fluid powered actuator; and the relief valve having an inlet connected to the exhaust port from the energization valve and an open exhaust port.

13. A standard transmission for a vehicle, comprising:

a clutch having an engaged state and a disengaged state;

a clutch pedal having a released position and a linkage engaged in a free travel position;

a linkage assembly connecting the clutch pedal to the clutch for moving the clutch between its engaged state and its disengaged state;

a compressed air powered actuator coupled to the linkage assembly for generating a force urging the linkage assembly in a direction for disengaging the clutch;

a spring connected to the linkage assembly to generate a force oppositely directed to the force generated by the fluid powered actuator;

a relief valve operable to vent air from the compressed air powered actuator when open and to prevent venting when closed, the clutch pedal being operative to open the relief valve when in its released position and for closing the relief valve when depressed from the released position;

a source of compressed air of regulated pressures;

an energization valve operable to deliver compressed air from the source of compressed air to the compressed air powered actuator when open, the energization valve being responsive to depression of the clutch pedal to the linkage engaged motion for opening.

14. A standard transmission for a vehicle as set forth in claim 13, further comprising:

first and second switches located for actuation by movement of the clutch pedal in the free travel, respectively;

first and second solenoid valve actuators for the relief valve and the energization valve, respectively, the first and second solenoid valve actuators being coupled for actuation by the first and second switches, respectively.

15. A standard transmission for a vehicle as set forth in claim 14, further comprising:

the energization valve having an inlet for receiving air from the source of compressed air, an exhaust port and an outlet to the compressed air powered actuator, the energization valve being operable in an open state to connect the inlet to the outlet and in the closed state for connecting the outlet to the exhaust port; and the relief valve having an inlet connected to the exhaust port and an outlet, and being operable in a closed state to block communication between its inlet and its outlet and in an open state to connect its inlet to the outlet.

* * * * *